United States Patent
Awadalla

(10) Patent No.: US 9,463,400 B2
(45) Date of Patent: Oct. 11, 2016

(54) FLUID FILTER WITH MAGNETIC PARTICLE ATTRACTION

(71) Applicant: Toyota Motor Engineering & Manufacturing North America, Inc., Erlanger, KY (US)

(72) Inventor: Hesham Ahmed Awadalla, Oakville (CA)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 556 days.

(21) Appl. No.: 13/662,654

(22) Filed: Oct. 29, 2012

(65) Prior Publication Data

US 2014/0116933 A1    May 1, 2014

(51) Int. Cl.
| | | |
|---|---|---|
| *B03C 1/22* | (2006.01) | |
| *B01D 35/06* | (2006.01) | |
| *B01D 24/34* | (2006.01) | |
| *B01D 33/04* | (2006.01) | |
| *B03C 1/033* | (2006.01) | |
| *B03C 1/28* | (2006.01) | |

(52) U.S. Cl.
CPC ............... *B01D 33/04* (2013.01); *B01D 35/06* (2013.01); *B03C 1/0332* (2013.01); *B03C 1/22* (2013.01); *B03C 1/286* (2013.01); *B03C 2201/18* (2013.01)

(58) Field of Classification Search
CPC .......... B03C 1/16; B03C 1/22; B03C 1/286; B03C 1/0332; B03C 2201/18; B01D 33/04; B01D 33/801; B01D 33/807; B01D 35/06
USPC ....... 210/783, 160, 400, 401, 222, 223, 695; 209/218
See application file for complete search history.

(56) References Cited

U.S. PATENT DOCUMENTS

| | | | |
|---|---|---|---|
| 3,876,547 A | | 4/1975 | Kaess |
| 4,005,018 A | | 1/1977 | Wyman et al. |
| 4,057,437 A | * | 11/1977 | Kracklauer ........ B01D 33/0064 127/2 |
| 4,158,629 A | | 6/1979 | Sawyer |
| 4,233,157 A | | 11/1980 | Miller |
| 4,267,060 A | | 5/1981 | Miller |
| 4,343,701 A | | 8/1982 | Parshall |
| 4,421,647 A | | 12/1983 | Estabrook et al. |
| 4,481,108 A | | 11/1984 | Bratten |
| 4,681,679 A | | 7/1987 | Reber |
| 4,973,407 A | * | 11/1990 | Wagner ......................... 210/387 |

(Continued)

FOREIGN PATENT DOCUMENTS

GB    2174014 A  *  10/1986

OTHER PUBLICATIONS

Definition of "Offset", www.dictionary.com, Accessed Feb. 16, 2016, pp. 1-5.*

(Continued)

*Primary Examiner* — David C Mellon
(74) *Attorney, Agent, or Firm* — Christopher G. Darrow; Darrow Mustafa PC

(57) ABSTRACT

A filtration apparatus for removing solids and particulates from a liquid stream flowing through a filter media. A magnet is located adjacent to the filter media and the liquid steam to attract metal particles in the liquid stream to the filter media. The magnet may be a rare earth magnet. A variable speed drive motor is coupled to a carrier supporting the filter media to advance the filter media through the liquid stream.

13 Claims, 5 Drawing Sheets

(56) References Cited

U.S. PATENT DOCUMENTS

| | | |
|---|---|---|
| 5,683,581 A | 11/1997 | Schimion et al. |
| 2003/0146174 A1* | 8/2003 | Hansen et al. ............... 210/770 |
| 2006/0076285 A1 | 4/2006 | Lewandowski |
| 2008/0149548 A1* | 6/2008 | White ............................ 210/222 |
| 2010/0224574 A1* | 9/2010 | Youngs et al. ................ 210/783 |

OTHER PUBLICATIONS

Kfactor Filter, KFactor Filter Filtration, advertisement, undated, printed from www.kfactorfilter.com on Sep. 13, 2012 in 4 pages.

Kfactor Filter, Maggie Liquid Filtration, advertisement, printed from www.kfactorfilter.com on Sep. 13, 2012 in 4 pages.

* cited by examiner

FLUID FILTER WITH MAGNETIC PARTICLE ATTRACTION

BACKGROUND

The following description relates, in general, to flatbed type fluid filters.

Filtration apparatus is used to remove solid contaminates from fluids used in manufacturing operations. In automobile assembly plants, the assembled sheet metal vehicle body is washed prior to painting operations. Other industrial operations involve machining of parts. The machined parts are washed to remove chips, cutting fluid residue, and other solids and particulate material.

In order to conserve resources, the wash fluid is recycled. The fluid is passed through a filtration apparatus which removes solids and other particulate materials so that the cleaned fluid may be recycled for further use in the industrial operations.

One type of filtration apparatus used in industrial operations is a flat-bed type filter in which a filter media in the form of a thin, porous strip is indexed through a chamber containing a reservoir of fluid from industrial operations. Gravity or pressure pulls the fluid through the filter media thereby removing solids and particulates from the fluid. The cleaned fluid is then recycled to the industrial operation. The solids and particulates collect on the filter media and are removed dirty as the filter media indexes out of the filtration apparatus.

Due to the high volume of wash fluid that is passed through the filter media for cleaning, the filter media rapidly clogs with the solids and particulates removed from the industrial fluid. The filter media is frequently indexed to bring clean filter media into the chamber to continue to clean the wash fluid. The solids and particulates form a cake or residue in the filter media which retains the solids and particulates in the filter media as the filter media exits the chamber to a waste receptacle.

Due to the porosity of the filter media, which may be as low as 10 microns, small particulates, particularly, metal particulates can pass through the filter media and then be recycled with the clean fluid back to the industrial operation.

It would be desirable to improve a filtration process using a filter media to clean wash fluids by removing a greater portion of metallic particles from the wash fluids as the fluid passes through the filter media.

SUMMARY

A filtration apparatus for removing solids and particulates from a fluid includes a filter media movable through a liquid stream, and a magnet positioned beneath the filter media at a location with respect to the liquid stream passing through the filter media to magnetically attract metal particles in the liquid stream to include the filter media.

The filtration apparatus includes the housing having an inlet and an outlet. The filter media is movable through the housing. A fluid reservoir is formed in the housing and includes a fluid containment structure and a portion of the filter media. A portion of the filter media is positioned with respect to the fluid reservoir to filter solids and particulates from the liquid stream as the liquid stream flows from the fluid reservoir through the filter media.

A fluid inlet is fluidically coupled to the housing to direct fluid to be cleaned into the housing. A fluid outlet is fluidically coupled to the housing to receive clean fluid after the fluid has passed through the filter media.

A first rotatable roller shaft is disposed in the housing. An electric drive motor having a rotatable output is coupled to the first roller shaft for rotating the first roller shaft. The filter media is moved by the first roller shaft through the housing.

The electric motor may be a variable speed motor for selectively varying the speed of movement of a filter media through the housing.

A second rotatable roller shaft is spaced from the first roller shaft in the housing. The filter media is supported between the first and second roller shafts to define a filtering region on the filtering media between the first and second roller shafts in fluid flow communication with the fluid reservoir.

A porous carrier belt is disposed in a closed loop around the first and second roller shafts. The carrier belt carries the filter media through the housing.

A liquid level sensor is mounted in the housing and is responsive to the level of fluid in the reservoir in the housing. The sensor generates an output to activate the electric drive motor to incrementally advance at least a portion of the filter media into the liquid stream.

The magnet may be a rare earth magnet. The magnet can be formed of stacked layers of magnetic material.

A non-ferrous support is mounted in the housing adjacent to the filter media. The magnet mounted in the support. The support can be formed of stainless steel.

BRIEF DESCRIPTION OF THE DRAWING

The various features, advantages and other uses of a filtration apparatus with magnetic particulate attraction will become more apparent by referring to the following detailed description and drawing in which.

DETAILED DESCRIPTION

Figure 1:
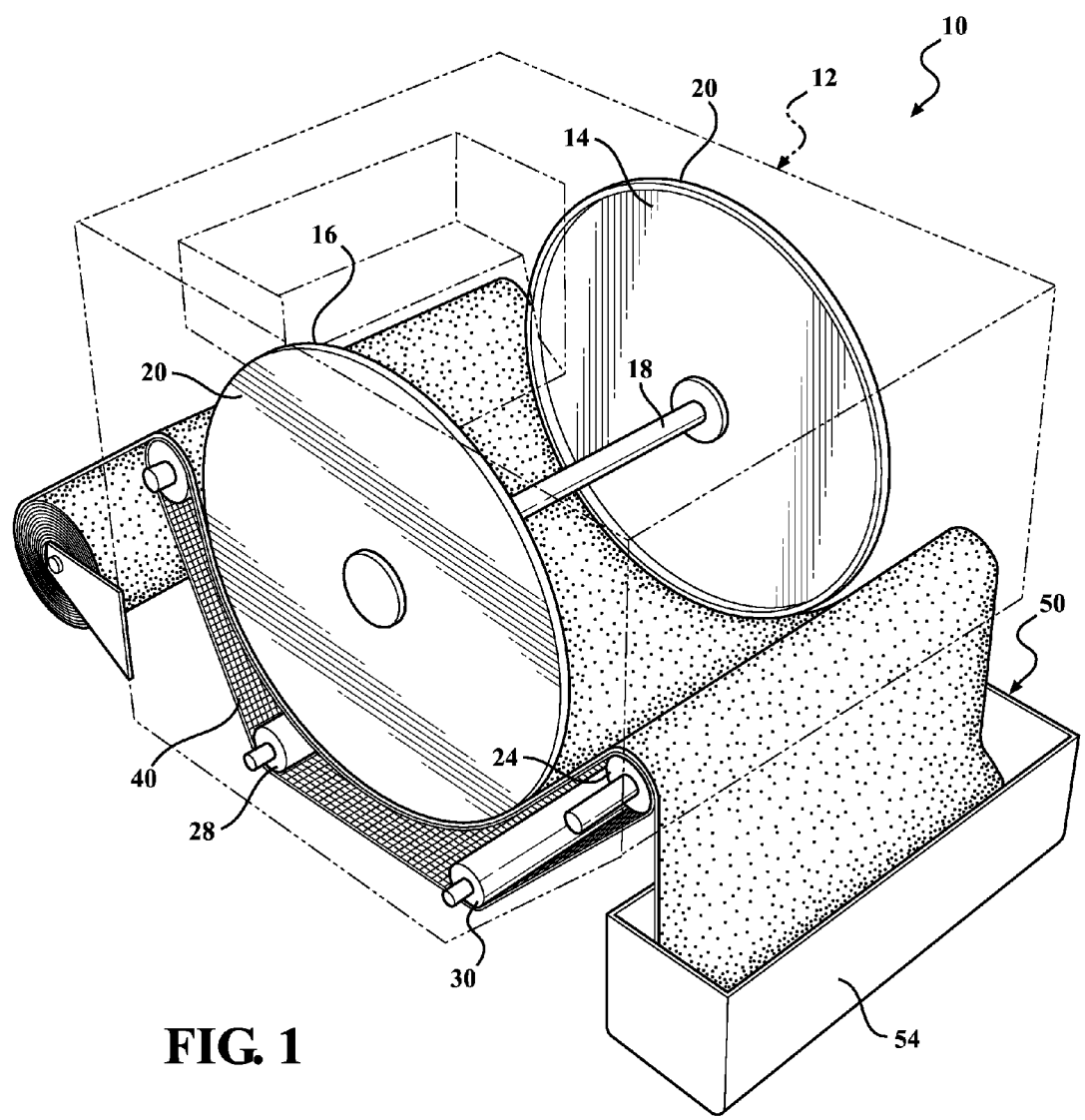
FIG. 1 is a top perspective view of a gravity bed type filtration apparatus.
Figure 2:
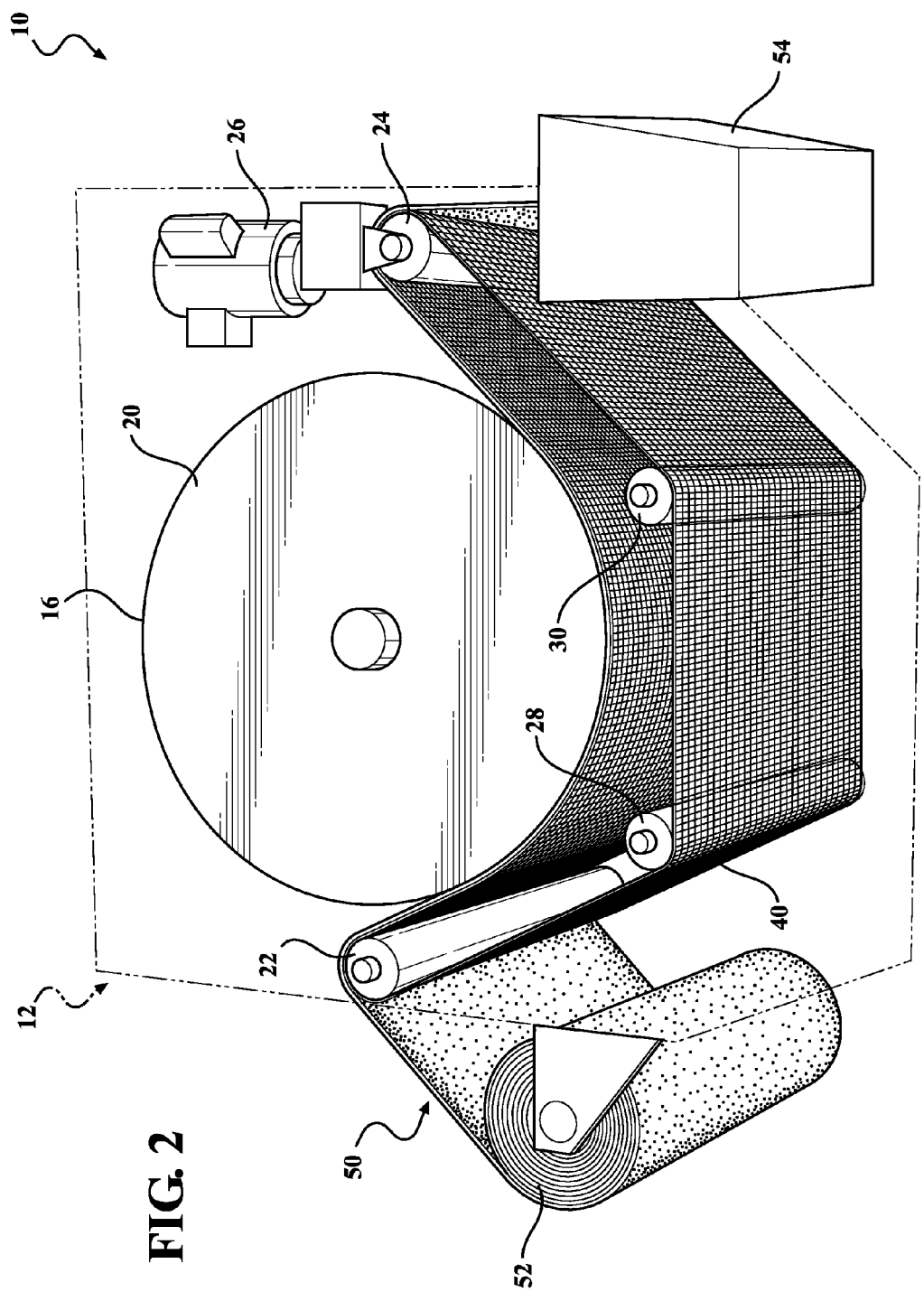
FIG. 2 is a bottom perspective view of the filtration apparatus shown in FIG. 1.
Figure 3:
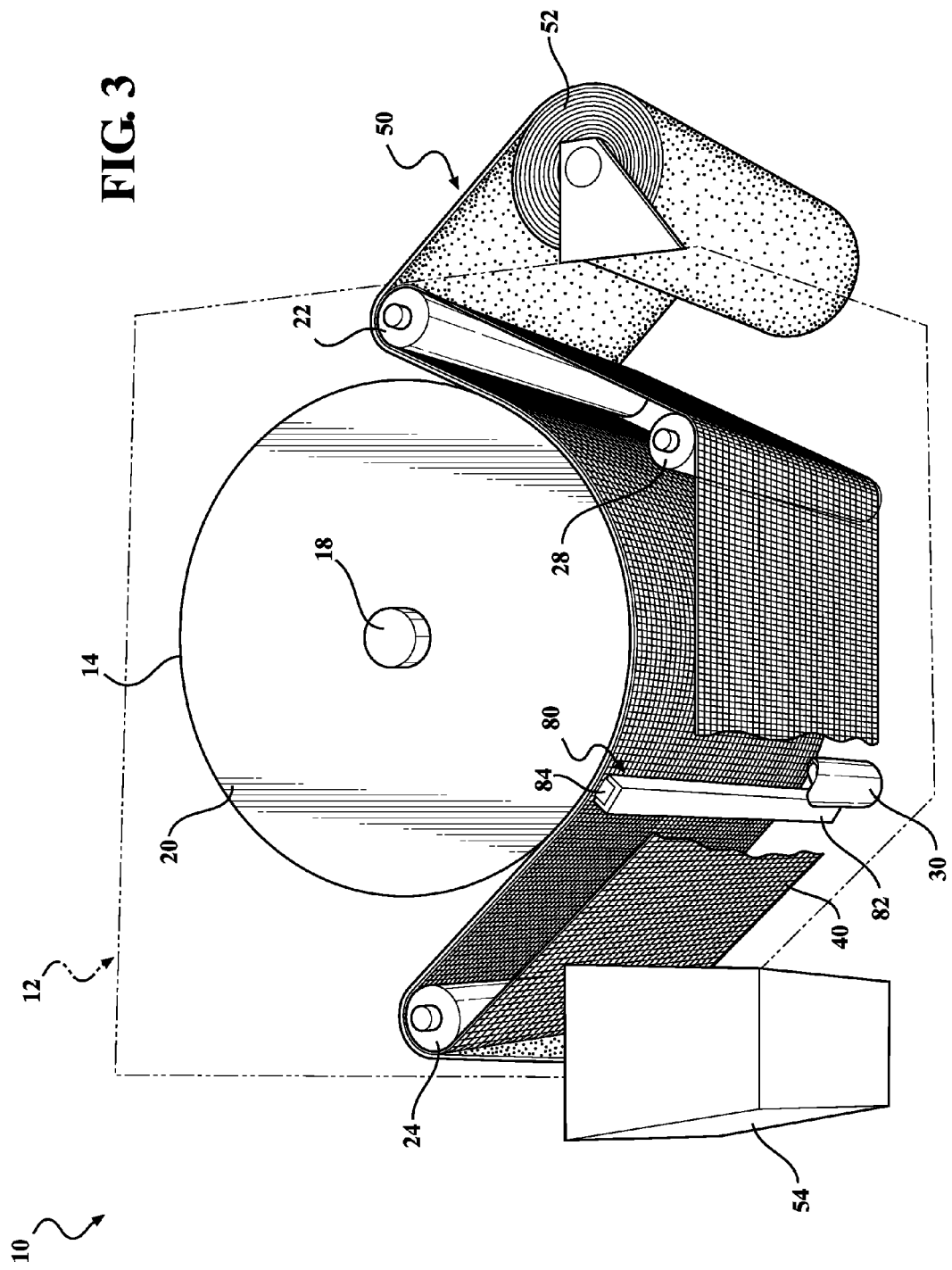
FIG. 3 is an opposite side, bottom perspective view of the filtration apparatus shown in FIGS. 1 and 2.

Referring now to the drawing, and particularly to FIGS. 1-6, there is depicted, by example, a flat-bed, gravity-type filtration apparatus 10 which may use an enhanced magnetic attraction particulate collection function described hereafter. The filtration apparatus 10 maybe, by example, a K-factor filter sold by the K-factor Filter Corporation, Ontario, Canada.

The filtration apparatus 10 includes a housing 12 which defines an internal chamber. A fluid reservoir forming assembly is mounted in the housing 12 to form a fluid containment structure and includes a pair of large diameter circular discs 14 and 16 which are spaced apart and connected by the central shaft 18 for simultaneous rotation. The discs 14 and 16 have a solid construction with a peripherally mounted resilient seal 20 mounted about the entire periphery of each disc 14 and 16. The seal 20 may be formed of any type of seal material rubber, such as polymeric, etc.

A pair of roller shafts 22 and 24 are mounted at approximately diametrically opposed edges of the discs 14 and 16 and generally extend parallel to the shaft 18 connecting the discs 14 and 16. The roller shafts 22 and 24 span the distance between the discs 14 and 16. One of the roller shafts 22 and 24, such as roller shaft 24 is coupled by a transmission or belt and sprocket to a rotative drive source, such as an electric drive motor 26.

A pair of idler shafts 28 and 30 are mounted in the lower portion of the housing 12. The idler shafts 28 and 30 are freely rotatable as is the non-power driven roller shaft 22.

A filter media carrying assembly is provided for advancing the filter media through the housing 12 underneath a liquid stream of contaminated wash fluid. An endless carrier belt 40 is mounted in a closed loop about the roller shafts 22 and 24 and the idler shafts 28 and 30. The carrier belt 40 is formed of a non-magnetic, non-ferrous material, such as stainless steel or plastic. The carrier belt 40 has an open mesh configuration to support the filter media 50 as well as to allow fluid passing through the filter media 40 to pass freely through the carrier belt 40. The width of the carrier belt 40 is slightly greater than the distance between the outer surfaces of the discs 14 and 16.

The carrier belt 40 is movable through rotation of the powered roller shaft 24 by the drive motor 26. The movement of the carrier belt 40 may be continuous or, as described in the following example, in an incremental, indexing manner.

The filter media 50 is in the form of an elongated thin strip having a porosity, such as 10 microns, for example. The filter media 50 is unwound from a roll 52 rotatably mounted on one side of the housing 12. The filter media 50 passes through an opening in a housing 12 over and between the roller shafts 22 and 24. After passing over the roller shafts 24, the filter media 50 passes through an exit opening in the housing 12 for collection in a waste receptacle 54. The fiber media 50 is supported between the roller shafts 22 and 24 by the carrier belt 40.

Figure 4:
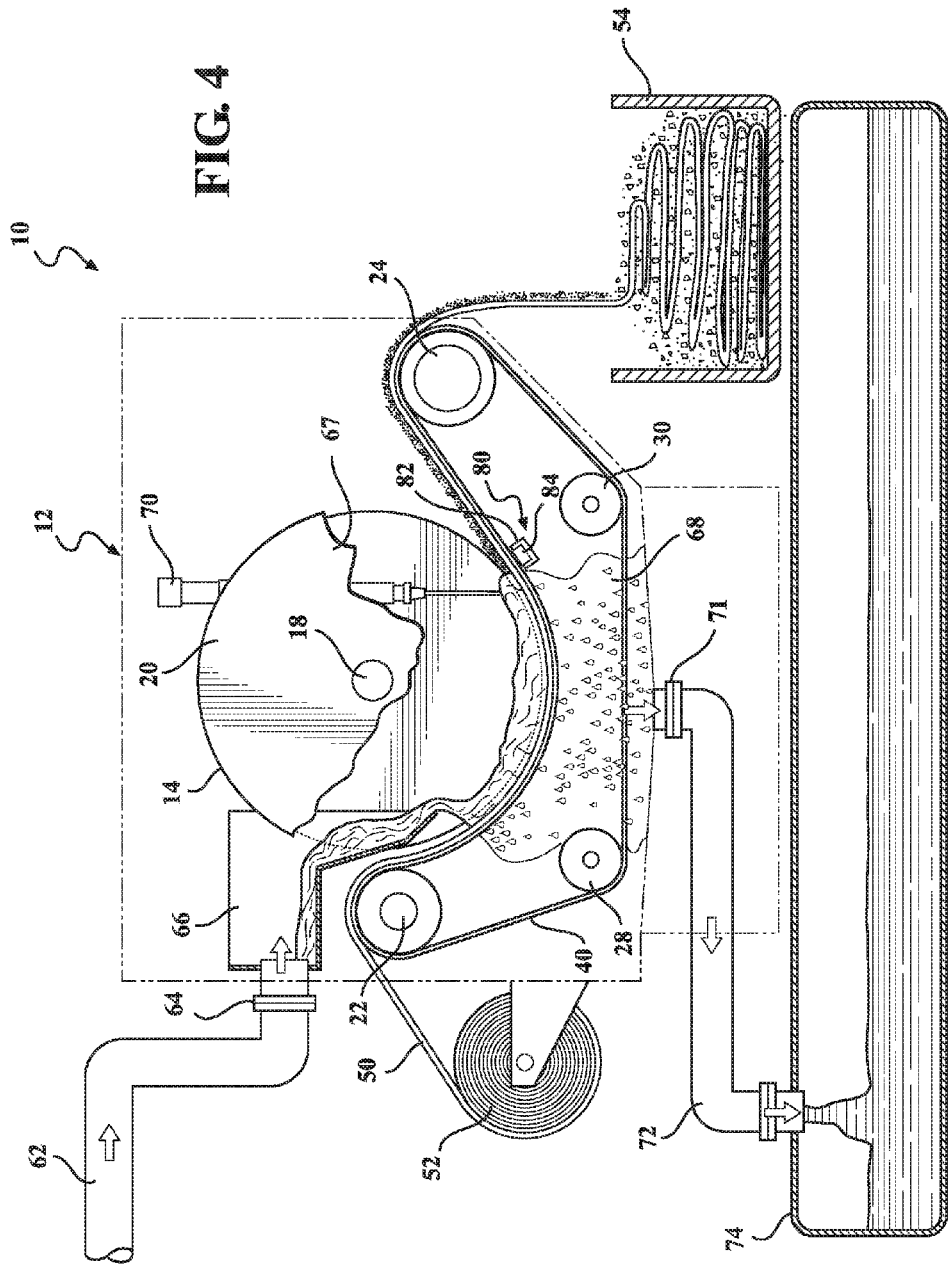
FIG. 4 is a side-elevational view of the filtration apparatus and magnet shown in FIG. 3.

Referring now to FIG. 4, the arrangement of the discs 14 and 16 and the roller shafts 22 and 24 forces the carrier belt 40 and the upper portion of the filter media 50 carried on the carrier belt 40 into an arcuate path between the roller shaft 22, the disc 14 and 16 and the roller shaft 24. The edge seal 20 on the discs 14 and 16 sealingly engages the edge portions of the filter media 50 to create a seal which forms a pool or reservoir 60 of fluid on top of the filter media 50 and between the lower portions of the disc 14 and 16.

Fluid to be cleaned is introduced into the housing 12 from an inlet conduit 62 via a fluid connection 64 to a header box 66 mounted in the housing 12. The header box 66 has a generally horizontally extending, rectangular configuration which forces the fluid entering the housing 12 through the fluid connection 64 to be disbursed in a horizontal manner across the width of the spaced discs 14 and 16. The fluid exits the header box 66 and flows in a turbulent manner into the bottom portion of the discs 14 and 16 where it is trapped in the reservoir 60 above the upper region 67 of the filter media 50. Gravity pulls the fluid through the filter media 50. As the fluid passes through the pores of filter media 50 in the upper region 67 of the path of the filter media 50, the filter media 50 removes solids and particulates from the fluid thereby creating substantially clean fluid denoted by reference number 68 which exits the housing 12 through a coupling 71 and a discharge pipe or conduit 72 to a fluid recovery apparatus denoted generally by reference number 74.

During the continuous flow of the fluid through the housing 12 and the filter media 50, the solids and particulates removed by the filter media 50 from the fluid collect on the upper surface of the filter media 50 and gradually close off the pores in the filter media 50. This causes the fluid level within the reservoir 60 to rise as less fluid can pass through the remaining open pores in the upper region 67 of the filter media 50. A float or liquid level sensor 70 is mounted in the housing 14 and is positioned to detect a predetermined height of fluid in the reservoir 60. When this predetermined fluid height is detected by the liquid level sensor 70, the liquid level sensor 70 sends a signal to the drive motor 26 which rotates the roller shaft 24 moving the carrier belt 40 and the filter media 50 in a counter-clockwise direction in the orientation shown in FIGS. 1-3 and in a clockwise direction in the orientation shown in FIG. 4.

The drive motor 26 moves the carrier belt 40 until the height of the fluid in the reservoir 60 falls below a predetermined level at which time the output signal from the level sensor 70 is removed causing power to be removed from the drive motor 50 thereby stopping rotation of the roller shaft 24 and resulting in halting of further advance of the carrier belt 40 and the filter media 50 through the housing 12.

By way of example, approximately 24 inches of filter media 50 is exposed in the upper filtering region 67 below the reservoir 60. The drive motor 26 is activated until approximately six inches of clean, fresh filter media 50 is pulled from the roll 50 and moved into the housing 14 into a portion of the upper filtering region 66. At the same time, the same length of filter media 50 moves outward from the upper filtering region 66 out of contact with the fluid in the reservoir 60. Despite the upward incline in the movement of the filter media 50 from the upper clean filtering region 67 up, over and around the roller shaft 24, the collected solids and particulates form a cake or coalesce into a scum which remains fixed on the filter media 50.

The advance of a new length of filter media 50 into the upper filter regions 67 immediately increases the number of open pores in the filer media 50 allowing additional quantities of fluid to pass from the reservoir 60 through the filter media 50. This causes the height of the fluid level in the reservoir 60 to drop until the output signal from the liquid level sensor 70 ceases.

It is possible due to the porosity of the filter media 50 for small metal particles resulting from various industrial machining or assembly operations to pass through the filter media 50. To minimize the amount of metal particles which pass the upper filtering region 67 of the filter media 50, a magnet assembly 80 is mounted in the housing 14 in a position to generate a magnetic field 86 over a portion of the reservoir 60 in the housing 12.

Figure 5:
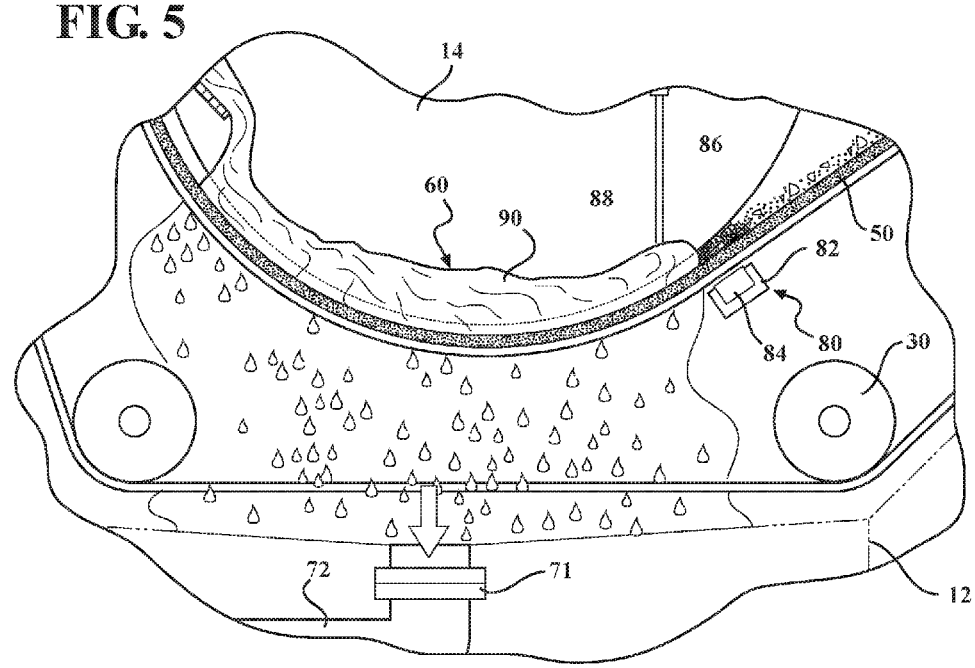
FIG. 5 is an enlarged, partial side-elevational pictorial representation showing the function of the magnet in the filtration apparatus depicted in FIG. 4.
Figure 6:
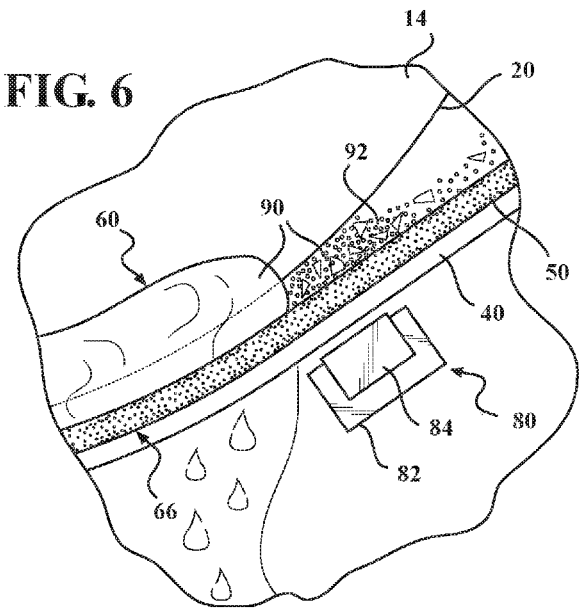
FIG. 6 is a further enlarged, pictorial representation of the collection of small particulates by the magnet depicted in the FIGS. 3-5.

As shown in FIGS. 4-6, the magnet assembly 80 is mounted adjacent an edge portion of the reservoir 60 to enable the magnetic field 86 of the magnet assembly 80 to be substantially focused on the edge region of the fluid in the fluid reservoir 60 above the upper filtering region 67 where the metal particles 90 are moving within the turbulent motion of the fluid in the reservoir 60. The magnetic field 86 attracts these metal particles 90 and draws them toward the filter media 50 at the edge portion of the upper cleaning region 67 and at the edge of the fluid reservoir 60, where the metal particles 90 are collected by the filter media 50 and are retained by the cake or scrim of collected solid and particulate materials already formed on the filter media 50 in the upper filtering region 67.

The lines 88 in FIG. 5 generally depict the direction that the magnetic field 86 generated by the magnetic assembly 80 draws the particles 90 toward the filter media 50.

The magnet assembly 80 includes a support 82 by way of example constructed as a U-shaped channel with one open side extending across the width of the reservoir 60 between the discs 14 and 16. The support 82 is formed of a non-magnetic material, such as stainless steel, plastic, etc.

Figure 7:
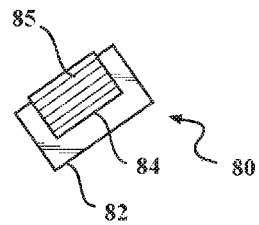
FIG. 7 is a view of a magnet formed of stacked layers of magnetic material.

The magnet 84 can be any type of permanent magnet capable of generating a magnetic field with sufficient strength to attract the small metal particles 90 in the fluid reservoir 60 toward the filter media 50. By way of example only, high strength rare earth magnets of 13,000-14,000 gauss magnetic force are mounted in the support 82. Although the magnet 84 may be formed as a single solid block or multiple end to end positioned blocks, it is also possible to form the rare earth magnet 84 of individual layers 85 which are arranged in a stack within the support 82 as shown in FIG. 7.

The selection of the magnetic field strength of the magnet 84 is made by taking into consideration along with the amount of indexing movement of the filer media 50 in each indexing cycle as well as the speed of movement of the filter media 50 to enable the additional metal particles 90 drawn by the magnet 84 and collected on the filter media 50 in a larger accumulation as shown by reference number 92 in FIG. 6, to be retained on the filter media 50 despite the upward inclined path of movement of the filter media 50 from the edge of the discs 14 and 16 to the roller shaft 24.

For this reason, the drive motor 26 can be a variable speed drive motor 26. This enables the speed of the drive motor 26 and thereby the speed of advance of the filter media 50 to be adjusted with respect to the magnetic field strength of the magnet 84 to enable most of the additional metal particles 90 collected on the filter media 50 to be retained on the filter media 50 as the filter media 50 moves up the incline and around the roller shaft 24; as well as, at the same time, allowing release of the metal particles 90 on the filter media 50 from the magnetic field 86 generated by the magnet 84 as the filter media 50 indexes in the next cycle of the movement.

What is claimed is:

1. A filtration apparatus for removing solids and particulates from a fluid comprising:
   a housing having an inlet and an outlet;
   a filter media movable through the housing and a liquid stream;
   a fluid inlet fluidically coupled to the housing to direct fluid to be cleaned into the housing;
   a fluid reservoir formed in the housing and defined by (i) a fluid containment structure including a pair of spaced apart circular discs, and (ii) a portion of the filter media, the portion of the filter media being positioned with respect to the fluid reservoir in the housing to filter solids and particulates from the liquid stream as the liquid stream flows from the fluid reservoir through the filter media;
   a fluid outlet fluidically coupled to the housing to receive clean fluid after the fluid has passed through the filter media; and
   a magnet positioned beneath the filter media, wherein the magnet extends across a width of the fluid reservoir between the spaced apart circular discs at a location adjacent an edge portion of the fluid reservoir where the filter media is disposed having an upward inclined path of movement in order to magnetically attract metal particles from an exit edge region of the fluid in the fluid reservoir to the filter media.

2. The filtration apparatus of claim 1 further comprising:
   a first rotatable roller shaft disposed in the housing;
   an electric drive motor rotatably coupled to the first rotatable roller shaft for rotating the first rotatable roller shaft;
   wherein the filter media is movable by the first roller shaft through the housing.

3. The filtration apparatus of claim 2 wherein:
   the electric drive motor is a variable speed motor for selectively varying a speed of movement of the filter media through the housing.

4. The filtration apparatus of claim 2 further comprising:
   a second rotatable roller shaft spaced from the first rotatable roller shaft;
   the filter media supported between the first and second rotatable roller shafts to define an upper filtering region between the first and second roller shafts in fluid flow communication with the fluid reservoir.

5. The filtration apparatus of claim 4 further comprising:
   a porous carrier belt disposed in a closed loop around the first and second roller shafts, the porous carrier belt carrying the filter media through the housing.

6. The filtration apparatus of claim 5 further comprising:
   a non-ferrous support mounted in the housing adjacent to the filter media, wherein the magnet is mounted in the support.

7. The filtration apparatus of claim 6 wherein:
   the non-ferrous support is formed of stainless steel.

8. The filtration apparatus of claim 2 further comprising:
   a liquid level sensor, mounted in the housing and responsive to a level of fluid in the fluid reservoir in the housing, for generating an output to activate the electric drive motor to advance at least a portion of the filter media through the liquid stream.

9. The filtration apparatus of claim 1 wherein:
   the magnet is a rare earth magnet.

10. The filtration apparatus of claim 9 wherein:
    the magnet is formed of stacked layers of magnetic material.

11. The filtration apparatus of claim 1 further comprising:
    a non-ferrous support mounted beneath the filter media, wherein the magnet is mounted in the support.

12. The filtration apparatus of claim 11 wherein:
    the non-ferrous support is formed of stainless steel.

13. The filtration apparatus of claim 1 further comprising:
    a first rotatable shaft coupled an electric variable speed drive motor and engaged with the filter media to advance the filter media through the liquid stream upon activation of the electric variable speed drive motor.

* * * * *